United States Patent
Kumar et al.

(10) Patent No.: US 11,260,426 B2
(45) Date of Patent: *Mar. 1, 2022

(54) IDENTIFYING COINS FROM SCRAP

(71) Applicant: Sortera Alloys, Inc., Fort Worth, TX (US)

(72) Inventors: Nalin Kumar, Fort Worth, TX (US); Manuel Gerardo Garcia, Jr., Lexington, KY (US); Ronnie Kip Lowe, Westworth Village, TX (US)

(73) Assignee: Sortera Alloys, hic., Fort Worth, TX (US)

(*) Notice: Subject to any disclaimer, the term of this patent is extended or adjusted under 35 U.S.C. 154(b) by 13 days.

This patent is subject to a terminal disclaimer.

(21) Appl. No.: 16/852,514

(22) Filed: Apr. 19, 2020

(65) Prior Publication Data

US 2020/0290088 A1    Sep. 17, 2020

Related U.S. Application Data

(60) Division of application No. 16/358,374, filed on Mar. 19, 2019, now Pat. No. 10,625,304, which is a
(Continued)

(51) Int. Cl.
*B07B 13/00* (2006.01)
*B07B 13/18* (2006.01)
(Continued)

(52) U.S. Cl.
CPC ............ *B07B 13/003* (2013.01); *B07B 13/18* (2013.01); *B07C 5/342* (2013.01); *G06K 9/48* (2013.01);
(Continued)

(58) Field of Classification Search
CPC ..... B07B 13/003; B07B 13/18; G06T 7/0006; G06T 2207/30141; G06T 2207/30136;
(Continued)

(56) References Cited

U.S. PATENT DOCUMENTS 2,194,381 A    9/1937   Cadman
2,417,878 A    2/1944   Luzietti et al.
(Continued)

FOREIGN PATENT DOCUMENTS

CA    2893877      12/2015
CN    200953004    9/2007
(Continued)

OTHER PUBLICATIONS

International Alloy Designations and Chemical Composition Limits for Wrought Aluminum and Wrought Aluminum Alloys, The Aluminum Association, Inc., revised Jan. 2015, 38 pages.
(Continued)

*Primary Examiner* — Michael McCullough
*Assistant Examiner* — Kalyanavenkateshware Kumar
(74) *Attorney, Agent, or Firm* — Kelly Kordzik

(57) ABSTRACT

A system classifies materials utilizing a vision system that implements a machine learning system, such as a neural network, in order to identify or classify each of the materials as either a monetary coin or not a monetary coin, which may then be sorted into separate groups based on such an identification or classification. Such a system can sort monetary coins from other forms of scrap, which may have been produced from a shredding of end of life vehicles.

26 Claims, 9 Drawing Sheets

Related U.S. Application Data continuation-in-part of application No. 15/963,755, filed on Apr. 26, 2018, now Pat. No. 10,710,119.

(60) Provisional application No. 62/490,219, filed on Apr. 26, 2017.

(51) Int. Cl.

| | | |
|---|---|---|
| *G06T 7/00* | | (2017.01) |
| *B07C 5/342* | | (2006.01) |
| *G06K 9/48* | | (2006.01) |
| *G06K 9/62* | | (2022.01) |

(52) U.S. Cl.
CPC ............ *G06K 9/627* (2013.01); *G06T 7/0006* (2013.01); *G06K 2209/19* (2013.01); *G06T 2207/30136* (2013.01); *G06T 2207/30141* (2013.01)

(58) Field of Classification Search
CPC .... B07C 5/04; B07C 5/10; B07C 5/34; B07C 5/342; B07C 5/346; B07C 5/3416; G06K 9/48; G06K 9/627; G06K 2209/19
See application file for complete search history.

(56) References Cited

U.S. PATENT DOCUMENTS

| | | | |
|---|---|---|---|
| 2,942,792 | A | 7/1957 | Anderson et al. |
| 2,953,554 | A | 9/1960 | Miller et al. |
| 3,512,638 | A | 5/1970 | Chengges et al. |
| 3,662,874 | A | 5/1972 | Muller |
| 3,791,518 | A | 2/1974 | Vanderhoof |
| 3,955,678 | A | 5/1976 | Moyer |
| 3,973,736 | A | 8/1976 | Nilsson |
| 3,974,909 | A | 8/1976 | Johnson |
| 4,004,681 | A | 1/1977 | Clewett et al. |
| 4,031,998 | A | 6/1977 | Suzuki et al. |
| 4,044,897 | A | 8/1977 | Maxted |
| 4,253,154 | A | 2/1981 | Russ et al. |
| 4,317,521 | A | 3/1982 | Clark et al. |
| 4,413,721 | A | 11/1983 | Bollier |
| 4,488,610 | A | 12/1984 | Yankloski |
| 4,586,613 | A | 5/1986 | Horii |
| 4,572,735 | A | 12/1986 | Poetzschke et al. |
| 4,726,464 | A | 2/1988 | Canziani |
| 4,834,870 | A | 5/1989 | Osterberg et al. |
| 4,848,590 | A | 7/1989 | Kelly |
| 5,054,601 | A | 10/1991 | Sjogren et al. |
| 5,114,230 | A | 5/1992 | Pryor |
| 5,236,092 | A | 8/1993 | Krotkov et al. |
| 5,260,576 | A | 11/1993 | Sommer, Jr. et al. |
| 5,410,637 | A | 4/1995 | Kern et al. |
| 5,433,311 | A | 7/1995 | Bonnet |
| 5,462,172 | A | 10/1995 | Kumagai et al. |
| 5,570,773 | A | 11/1996 | Bonnet |
| 5,663,997 | A | 9/1997 | Willis et al. |
| 5,676,256 | A | 10/1997 | Kumar et al. |
| 5,733,592 | A | 3/1998 | Wettstein et al. |
| 5,738,224 | A | 4/1998 | Sommer, Jr. et al. |
| 5,836,436 | A | 11/1998 | Fortenbery et al. |
| 5,911,327 | A | 6/1999 | Tanaka et al. |
| 6,076,653 | A | 6/2000 | Bonnet |
| 6,100,487 | A | 8/2000 | Schultz et al. |
| 6,148,990 | A | 11/2000 | Lapeyre et al. |
| 6,266,390 | B1 | 7/2001 | Sommer, Jr. et al. |
| 6,273,268 | B1 | 8/2001 | Axmann |
| 6,313,422 | B1 | 11/2001 | Anibas |
| 6,412,642 | B2 | 7/2002 | Charles et al. |
| 6,457,859 | B1 | 10/2002 | Lu et al. |
| 6,519,315 | B2 | 2/2003 | Sommer, Jr. et al. |
| 6,795,179 | B2 | 9/2004 | Kumar |
| 6,888,917 | B2 | 5/2005 | Sommer, Jr. et al. |
| 6,983,035 | B2 | 1/2006 | Price et al. |
| 7,073,651 | B2 | 7/2006 | Costanzo et al. |
| 7,099,433 | B2 | 8/2006 | Sommer et al. |
| 7,200,200 | B2 | 4/2007 | Laurila et al. |
| 7,341,154 | B2 | 3/2008 | Boer |
| 7,564,943 | B2 | 7/2009 | Sommer, Jr. et al. |
| 7,616,733 | B2 | 11/2009 | Sommer et al. |
| 7,674,994 | B1 | 3/2010 | Valerio |
| 7,763,820 | B1 | 7/2010 | Sommer, Jr. et al. |
| 7,848,484 | B2 | 12/2010 | Sommer, Jr. et al. |
| 7,886,915 | B2 | 2/2011 | Shulman |
| 7,903,789 | B2 | 3/2011 | Morton et al. |
| 7,978,814 | B2 | 7/2011 | Sommer et al. |
| 7,991,109 | B2 | 8/2011 | Golenhofen |
| 8,073,099 | B2 | 12/2011 | Niu et al. |
| 8,144,831 | B2 | 3/2012 | Sommer, Jr. et al. |
| 8,172,069 | B2 | 5/2012 | Prakasam |
| 8,429,103 | B1 | 4/2013 | Aradhye et al. |
| 8,433,121 | B2 | 4/2013 | Kosarev |
| 8,476,545 | B2 | 7/2013 | Sommer et al. |
| 8,553,838 | B2 | 10/2013 | Sommer et al. |
| 8,567,587 | B2 | 10/2013 | Faist et al. |
| 8,576,988 | B2 | 11/2013 | Lewalter et al. |
| 8,615,123 | B2 * | 12/2013 | Dabic ...................... G07D 3/14 382/136 |
| 8,654,919 | B2 | 2/2014 | Sabol et al. |
| 8,855,809 | B2 | 10/2014 | Spencer et al. |
| 8,903,040 | B2 | 12/2014 | Maeyama et al. |
| 9,316,596 | B2 | 4/2016 | Levesque |
| 9,785,851 | B1 | 10/2017 | Torek et al. |
| 2003/0038064 | A1 | 2/2003 | Harbeck et al. |
| 2003/0147494 | A1 | 8/2003 | Sommer, Jr. et al. |
| 2004/0151364 | A1 | 8/2004 | Kenneway et al. |
| 2006/0239401 | A1 | 10/2006 | Sommer, Jr. et al. |
| 2008/0029445 | A1 | 2/2008 | Russcher et al. |
| 2008/0041501 | A1 | 2/2008 | Platek |
| 2008/0092922 | A1 | 4/2008 | Dick |
| 2008/0257795 | A1 | 10/2008 | Shuttleworth |
| 2010/0017020 | A1 | 1/2010 | Hubbard-Nelson et al. |
| 2010/0195795 | A1 | 8/2010 | Golenhofen |
| 2010/0264070 | A1 | 10/2010 | Sommer, Jr. et al. |
| 2010/0282646 | A1 | 11/2010 | Looy et al. |
| 2011/0083871 | A1 | 4/2011 | Lalancette et al. |
| 2011/0247730 | A1 | 10/2011 | Yanar |
| 2012/0148018 | A1 | 6/2012 | Sommer, Jr. et al. |
| 2012/0288058 | A1 | 11/2012 | Maeyama et al. |
| 2013/0028487 | A1 | 1/2013 | Stager et al. |
| 2013/0079918 | A1 | 3/2013 | Spencer et al. |
| 2013/0092609 | A1 | 4/2013 | Andersen |
| 2013/0126399 | A1 | 5/2013 | Wolff et al. |
| 2013/0229510 | A1 | 9/2013 | Killmann |
| 2013/0264249 | A1 | 10/2013 | Sommer, Jr. et al. |
| 2013/0304254 | A1 | 11/2013 | Torek et al. |
| 2015/0092922 | A1 | 4/2015 | Liu et al. |
| 2015/0170024 | A1 | 6/2015 | Chatterjee et al. |
| 2016/0016201 | A1 | 1/2016 | Schons |
| 2016/0022892 | A1 | 1/2016 | Eifler et al. |
| 2016/0180626 | A1 * | 6/2016 | Young ................... G07D 11/24 194/206 |
| 2016/0299091 | A1 | 10/2016 | Bamber et al. |
| 2016/0346811 | A1 | 12/2016 | Iino |
| 2017/0014868 | A1 | 1/2017 | Kumar et al. |
| 2017/0221246 | A1 | 8/2017 | Zhong et al. |
| 2017/0232479 | A1 * | 8/2017 | Pietzka ................. B07C 5/3422 209/3.3 |

FOREIGN PATENT DOCUMENTS

| | | |
|---|---|---|
| CN | 201440132 | 4/2010 |
| CN | 201464390 | 5/2010 |
| CN | 101776620 A | 7/2010 |
| CN | 201552461 | 7/2010 |
| CN | 103745901 | 4/2014 |
| CN | 101776620 B | 6/2014 |
| CN | 103955707 | 7/2014 |
| CN | 203688493 | 7/2014 |
| CN | 204359695 | 5/2015 |
| CN | 204495749 | 7/2015 |
| CN | 204537711 | 8/2015 |
| CN | 204575572 | 8/2015 |
| DE | 202009006383 | 9/2009 |

(56) References Cited

FOREIGN PATENT DOCUMENTS

| | | |
|---|---|---|
| EP | 0011892 | 11/1983 |
| EP | 0074447 | 1/1987 |
| EP | 0433828 A2 | 12/1990 |
| EP | 0351778 B1 | 10/1993 |
| EP | 2243089 A1 | 10/2010 |
| JP | 5083196 | 11/2012 |
| RU | 2004101401 | 2/2005 |
| RU | 2006136756 | 4/2008 |
| RU | 2339974 | 11/2008 |
| RU | 2361194 | 7/2009 |
| WO | WO2001/022072 | 3/2001 |
| WO | WO2009/039284 | 3/2009 |
| WO | WO2011/159269 | 12/2011 |
| WO | WO2012/094568 A2 | 7/2012 |
| WO | WO2013/033572 | 3/2013 |
| WO | WO2013/180922 | 12/2013 |
| WO | WO2015/195988 | 12/2015 |
| WO | WO2016/199074 | 12/2016 |
| WO | WO2017/001438 | 1/2017 |
| WO | WO2017/221246 | 12/2017 |

OTHER PUBLICATIONS

International Searching Authority, International Search Report and the Written Opinion, International Application No. PCT/US2016/042850, dated Sep. 28, 2016.

P. R. Schwoebel et al., "Studies of a prototype linear stationary x-ray source for tomosynthesis imaging," Phys. Med Biol. 59, pp. 2393-2413, Apr. 17, 2014.

R. Sitko et al., "Quantification in X-Ray Fluorescence Spectrometry," X-Ray Spectroscopy, Dr. Shatendra K Sharma (Ed.), ISBN: 978-953-307-967-7, InTech, 2012, pp. 137-163; Available from: http://www.intechopen.com/books/x-ray-spectroscopy/quantification-in-x-ray-fluorescence-spectrometry.

Scrap Specifications Circular, Institute of Scrap Recycling Industries, Inc., effective Jan. 21, 2016, 58 pages.

The International Bureau of WIPO, International Preliminary Report on Patentability, International Application No. PCT/US2016/42850, dated Jan. 25, 2018.

A. Lee, "Comparing Deep Neural Networks and Traditional Vision Algorithms in Mobile Robotics," Swarthmore College, 9 pages, downloaded from Internet on May 1, 2018.

C. K. Lowe et al., "Data Mining With Different Types of X-Ray Data," JCPDS—International Centre for Diffraction Data 2006, ISSN 1097-0002, pp. 315-321.

M. Razzak et al., "Deep Learning for Medical Image Processing: Overview, Challenges and Future," 30 pages, downloaded from Internet on May 1, 2018.

J. Schmidhuber et al., "Deep Learning in Neural Networks: An Overview," The Swiss AI Lab IDSIA, Technical Report IDSIA-03-14/arXiv:1404.7828 v4 [cs.Ne], Oct. 8, 2014, 88 pages.

M. Singh et al., "Transforming Sensor Data to the Image Domain for Deep Learning—an Application to Footstep Detection," International Joint Conference on Neural Networks, Anchorage, Alaska, 8 pages, May 14-19, 2017.

K. Tarbell et al., "Applying Machine Learning to the Sorting of Recyclable Containers," University of Illinois at Urbana-Champaign, Urbana, Illinois, 7 pages, downloaded from Internet on May 1, 2018.

Wikipedia, Convolutional neural network, 18 pages https://en.wikipedia.org/w/index.php?title=Convolutional_neural_network, downloaded from Internet on May 1, 2018.

Wikipedia, TensorFlow, 4 pages https://en.wikipedia.org/w/index.php?title=TensorFlow&oldid=835761390, downloaded from Internet on May 1, 2018.

The United States Patent and Trademark Office, Non-Final Office Action, U.S. Appl. No. 15/213,129, dated Oct. 6, 2017.

International Searching Authority, International Search Report and the Written Opinion, International Application No. PCT/US2018/029640, dated Jul. 23, 2018.

European Patent Office; Extended Search Report for 16825313.6; dated Jan. 28, 2019; 12 pages; Munich, DE.

International Searching Authority, International Search Report and the Written Opinion, International Application No. PCT/US2019/022995, dated Jun. 5, 2019; 10 pages.

European Patent Office; Extended European Search Report for corresponding EP 19792330.3; dated Apr. 30, 2021; 7 pages; Munich, DE.

India Patent Office; Office Action issued for corresponding India Application Serial No. 201937044046; dated Jun. 4, 2020; 7 pages; IN.

United States International Searching Authority; International Search Report & Written Opinion for PCT/US2016/042850; dated Sep. 28, 2016; 15 pages; Alexandria, VA; U.S.

India Patent Office; Office Action issued for corresponding India Application Serial No. 201817002365; dated Mar. 12, 2020; 6 pages; IN.

International Searching Authority, International Search Report and the Written Opinion, International Application No. PCT/US2019/022995, dated Jun. 5, 2019; 10 pages; Alexandria, VA; U.S.

The United States Patent and Trademark Office, Non-Final Office Action, U.S. Appl. No. 16/375,675, dated Jun. 28, 2019.

The United States Patent and Trademark Office, Final Office Action, U.S. Appl. No. 16/375,675, dated Jan. 17, 2020.

"Alloy Data: Aluminum Die Casting Alloys," MES, Inc., 4 pages, downloaded from the internet Mar. 28, 2019, www.mesinc.com.

C.O. Augustin et al., "Removal of Magnesium from Aluminum Scrap and Aluminum-Magnesium Alloys," Bulletin of Electrochemistry 2(6), Nov.-Dec. 1986; pp. 619-620.

E.A. Vieira et al., "Use of Chlorine to Remove Magnesium from Molten Aluminum," Materials Transactions, vol. 53, No. 3, pp. 477-482, Feb. 25, 2012.

Specim Spectral Imaging; Hyperspectral Technology vs. RGB; at least as early as Mar. 9, 2021; 3 pages; Oulu, Finland.

\* cited by examiner

IDENTIFYING COINS FROM SCRAP

This application is a divisional of U.S. patent application Ser. No. 16/358,374, which issued as U.S. Pat. No. 10,625,304, which is a continuation-in-part of U.S. patent application Ser. No. 15/963,755, which claims benefit to U.S. Provisional Patent Application Ser. No. 62/490,219, both of which are hereby incorporated by reference herein.

GOVERNMENT LICENSE RIGHTS

This disclosure was made with U.S. government support under Grant No. DE-AR0000422 awarded by the U.S. Department of Energy. The U.S. government may have certain rights in this disclosure.

TECHNOLOGY FIELD

The present disclosure relates in general to the sorting of materials, and in particular, to the sorting of certain valuables from scrap.

BACKGROUND INFORMATION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Recycling is the process of collecting and processing materials that would otherwise be thrown away as trash, and turning them into new products. Recycling has benefits for communities and for the environment, since it reduces the amount of waste sent to landfills and incinerators, conserves natural resources, increases economic security by tapping a domestic source of materials, prevents pollution by reducing the need to collect new raw materials, and saves energy. After collection, recyclables are generally sent to a material recovery facility to be sorted, cleaned, and processed into materials that can be used in manufacturing.

It has been discovered that many automotive vehicles designated for shredding and subsequent recycling processes have a relatively significant number of monetary coins located within them, such as between the seats, underneath floor mats, etc. At least one study estimates that there can be about US$10-$15 of coins per vehicle. Likewise, such vehicles can contain lost jewelry.

Additionally, automotive vehicles include printed circuit boards ("PCBs"), which contain valuable metals (e.g., copper, gold, silver, etc.) that can be recycled.

Considering the large number of vehicles being recycled each year, there is a desire within the recycling industry for a technique for recovering such valuable scrap pieces as a profitable byproduct of the normal vehicle recycling process. Moreover, a federal law was recently passed dictating that the U.S. government will pay face value for certain coins even when they are damaged.

DETAILED DESCRIPTION

Figure 1:
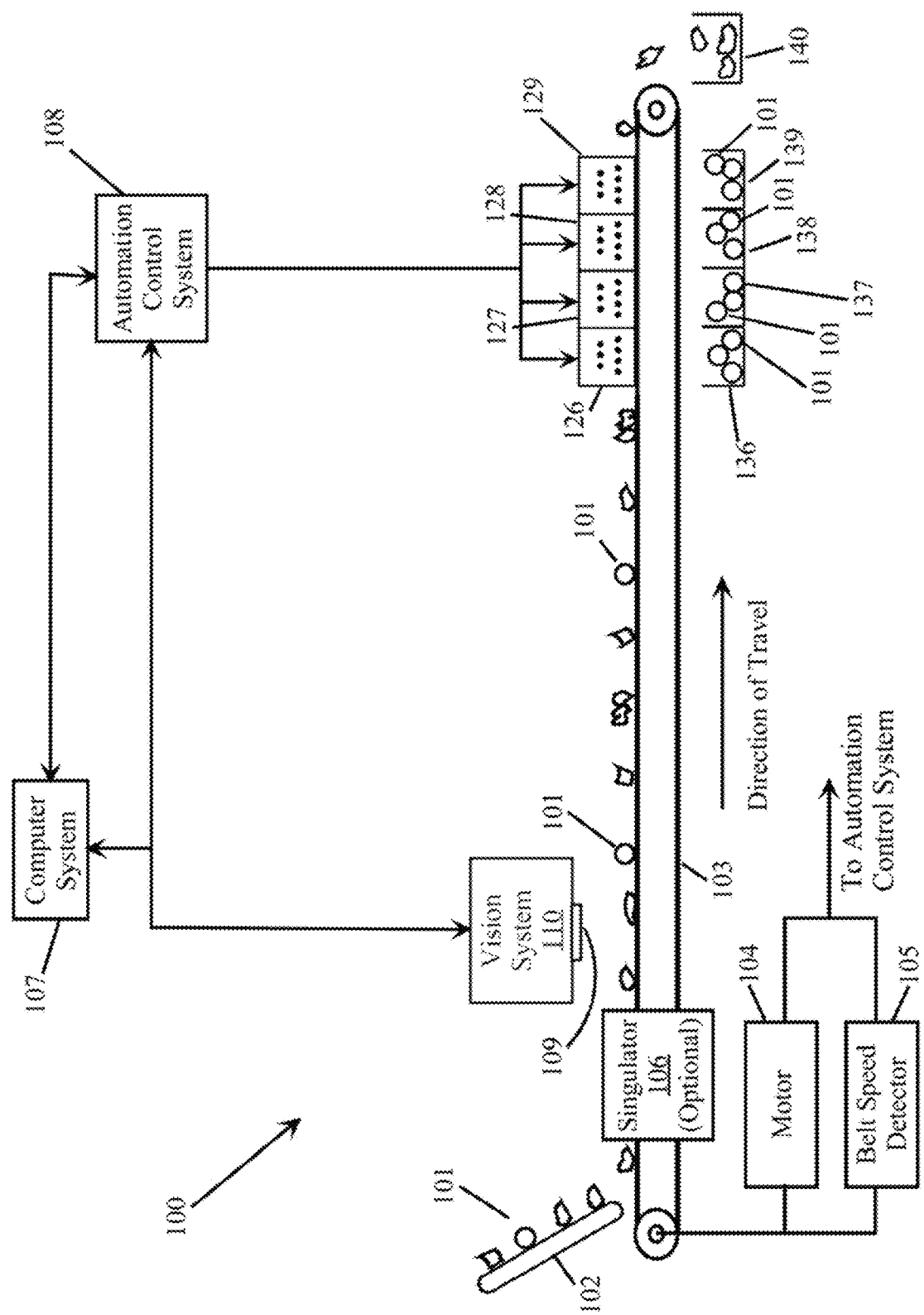
FIG. 1 illustrates a schematic of a sorting system configured in accordance with embodiments of the present disclosure.

Various detailed embodiments of the present disclosure are disclosed herein. However, it is to be understood that the disclosed embodiments are merely exemplary of the disclosure, which may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ various embodiments of the present disclosure.

Embodiments of the present disclosure effectively recycle specified valuable scrap pieces (e.g., monetary coins, jewelry, PCBs, copper, brass, etc.) from shredded scrap (e.g., automobile (automotive) scrap) by utilizing a machine learning based vision system as described herein.

As used herein, a "material" may include any physical item, including but not limited to a scrap piece. Classes or types of materials may include metals (ferrous and nonferrous), metal alloys, monetary coins, jewelry (e.g., rings, earrings, necklaces, bracelets, etc.), pieces of gold or silver, buttons, electrical box knockouts, washers, plastics (including, but not limited to PCB, HDPE, UHMWPE, and various colored plastics), rubber, foam, glass (including, but not limited to borosilicate or soda lime glass, and various colored glass), ceramics, paper, cardboard, Teflon, PE, bundled wires, insulation covered wires, rare earth elements, etc. As used herein, the terms "scrap" and "scrap pieces" refer to material pieces in a solid state. Within this disclosure, the terms "scrap," "scrap pieces," "materials," and "material pieces" may be used interchangeably.

As used herein, a heterogeneous mixture of materials means a collection of different individual classes or types of materials. As used herein, a homogeneous set of materials means a collection of individual materials of a same or substantially similar class or type.

As defined within the Guidelines for Nonferrous Scrap promulgated by the Institute Of Scrap Recycling Industries, Inc., the term "Zorba" is the collective term for shredded nonferrous metals, including, but not limited to, those originating from end-of-life vehicles ("ELVs") or waste electronic and electrical equipment ("WEEE"). The Institute Of Scrap Recycling Industries, Inc. ("ISRI") in the United States established the specifications for Zorba. In Zorba, each scrap piece may be made up of a combination of the nonferrous metals (e.g., aluminum, copper, lead, magnesium, stainless steel, nickel, tin, and zinc, in elemental or alloyed (solid) form). Furthermore, the term "Twitch" shall mean fragmented aluminum scrap. Twitch may be produced by a float process whereby the aluminum scrap floats to the top because heavier metal scrap pieces sink (for example, in some process, sand may be mixed in to change the density of the water in which the scrap is immersed).

As used herein, the terms "identify" and "classify," and the terms "identification" and "classification," may be utilized interchangeably. For example, in accordance with certain embodiments of the present disclosure, a vision system (as further described herein) may be configured (e.g., with a machine learning system) to collect any type of information that can be utilized within a sorting system to selectively sort materials (e.g., scrap pieces) as a function of a set of one or more (user-defined) physical characteristics, including, but not limited to, color, size, shape, texture, physical appearance, uniformity, hue, and/or manufacturing type, of the materials.

Figure 3A:
FIG. 3A shows a visual image of various exemplary monetary coins.
Figure 3B:
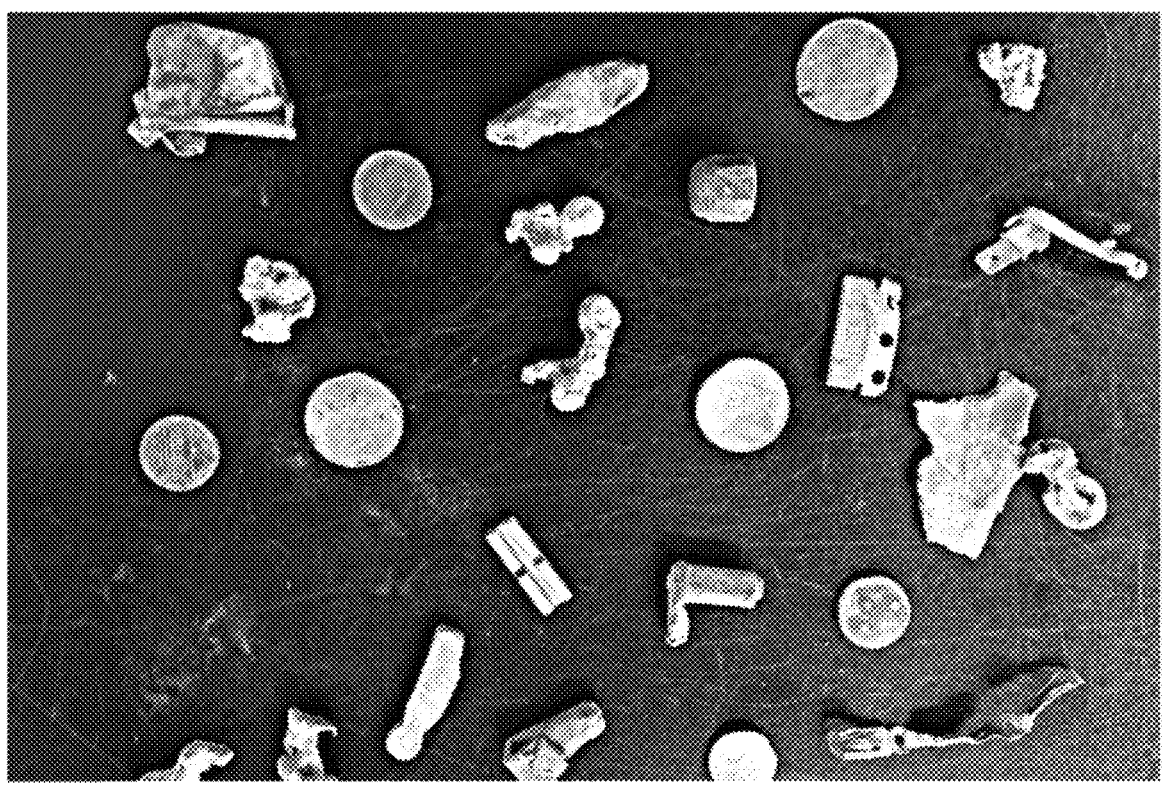
FIG. 3B shows a visual image of exemplary monetary coins mixed with other scrap pieces.
Figure 3C:
FIG. 3C shows a visual image of various exemplary pieces of jewelry.
Figure 3D:
FIG. 3D shows a visual image of exemplary pieces of jewelry mixed with other scrap pieces.

It should be noted that at least some of the materials to be sorted may have irregular sizes and shapes (e.g., see FIGS. 3B and 3D). For example, such material (e.g., Zorba and/or Twitch) may have been previously run through some sort of shredding mechanism that chops up the materials into such irregularly shaped and sized pieces (producing scrap pieces), which may then be fed onto a conveyor system.

Embodiments of the present disclosure will be described herein as sorting materials (e.g., scrap pieces) into such separate groups by physically depositing (e.g., ejecting) the materials (e.g., scrap pieces) into separate receptacles or bins as a function of user-defined classifications. As an example, within certain embodiments of the present disclosure, materials (e.g., scrap pieces) may be sorted into separate bins in order to separate specified valuable scrap pieces from other scrap materials. Such specified (by the user of the system 100) valuable scrap pieces may be monetary coins, jewelry (e.g., rings, earrings, necklaces, bracelets, etc.), precious metals (e.g., gold, silver, platinum, copper, brass, etc.), or PCBs (which can contain valuable metals (e.g., gold, silver, copper).

FIG. 1 illustrates an example of an automated material sorting system 100 configured in accordance with various embodiments of the present disclosure to automatically (i.e., does not require human manual intervention) sort materials. Hereinafter, embodiments of the present disclosure will be described as sorting scrap pieces, though such embodiments are applicable to sorting any types of materials. A conveyor system 103 may be implemented to convey one or more streams of individual scrap pieces 101 through the sorting system 100 so that each of the individual scrap pieces 101 can be tracked, classified, and sorted into predetermined desired groups. Such a conveyor system 103 may be implemented with one or more conveyor belts on which the scrap pieces 101 travel, typically at a predetermined constant speed. However, certain embodiments of the present disclosure may be implemented with other types of conveyor systems, including vibratory and mechanical conveyors, and a system in which the scrap pieces free fall past the various components of the sorting system. Hereinafter, the conveyor system 103 will simply be referred to as the conveyor belt 103.

Furthermore, though the illustration in FIG. 1 depicts a single stream of scrap pieces 101 on a conveyor belt 103, embodiments of the present disclosure may be implemented in which a plurality of such streams of scrap pieces are passing by the various components of the sorting system 100 in parallel with each other, or a collection of scrap pieces deposited in a random manner onto the conveyor belt 103 are passed by the various components of the sorting system 100. As such, certain embodiments of the present disclosure are capable of simultaneously tracking, classifying, and sorting a plurality of such parallel travelling streams of scrap pieces, or scrap pieces randomly deposited onto a conveyor belt. In accordance with embodiments of the present disclosure, singulation of the scrap pieces 101 is not required for the vision system to track, classify, and sort the scrap pieces.

In accordance with certain embodiments of the present disclosure, some sort of suitable feeder mechanism may be utilized to feed the scrap pieces 101 onto the conveyor belt 103, whereby the conveyor belt 103 conveys the scrap pieces 101 past various components within the sorting system 100. Within certain embodiments of the present disclosure, the conveyor belt 103 is operated to travel at a predetermined speed by a conveyor belt motor 104. This predetermined speed may be programmable and/or adjustable by the operator in any well-known manner. Monitoring of the predetermined speed of the conveyor belt 103 may alternatively be performed with a belt speed detector 105. Within certain embodiments of the present disclosure, control of the conveyor belt motor 104 and/or the belt speed detector 105 may be performed by an automation control system 108. Such an automation control system 108 may be operated under the control of a computer system 107 and/or the functions for performing the automation control may be implemented in software within the computer system 107.

The conveyor belt 103 may be a conventional endless belt conveyor employing a conventional drive motor 104 suitable to move the conveyor belt 103 at the predetermined speeds. A belt speed detector 105, which may be a conventional encoder, may be operatively coupled to the conveyor belt 103 and the automation control system 108 to provide information corresponding to the movement (e.g., speed) of the conveyor belt 103. Thus, as will be further described herein, through the utilization of the controls to the conveyor belt drive motor 104 and/or the automation control system 108 (and alternatively including the belt speed detector 105), as each of the scrap pieces 101 travelling on the conveyor belt 103 are identified, they can be tracked by location and time (relative to various components of the system 100) so that the various components of the sorting system 100 can be activated/deactivated as each scrap piece 101 passes within their vicinity. As a result, the automation control system 108 is able to track the location of each of the scrap pieces 101 while they travel along the conveyor belt 103.

In accordance with certain embodiments of the present disclosure, after the scrap pieces 101 are received by the conveyor belt 103, a tumbler and/or a vibrator (not shown) may be utilized to separate the individual scrap pieces from a collection of scrap pieces. In accordance with alternative embodiments of the present disclosure, the scrap pieces may be positioned into one or more singulated (i.e., single file) streams, which may be performed by an optional active or passive singulator 106. As previously discussed, incorporation or use of a singulator is not required. Instead, the conveyor system (e.g., the conveyor belt 103) may simply convey a collection of scrap pieces, which have been positioned on the conveyor belt 103 in a random manner.

Referring again to FIG. 1, embodiments of the present disclosure may utilize a vision, or optical recognition, system 110 as a means to begin tracking each of the scrap pieces 101 as they travel on the conveyor belt 103. The vision system 110 may utilize one or more still or live action cameras 109 (which may include one or more three-dimensional cameras) to note the position (i.e., location and timing) of each of the scrap pieces 101 on the moving conveyor belt 103. The vision system 110 may be further configured to perform certain types of identification (e.g., classification) of all or a portion of the scrap pieces 101. For example, such a vision system 110 may be utilized to acquire information about each of the scrap pieces 101. For example, the vision system 110 may be configured (e.g., with a machine learning system) to collect any type of information that can be utilized within the system 100 to selectively sort the scrap pieces 101 as a function of a set of one or more (user-defined) physical characteristics, including, but not limited to, color, size, shape, texture, overall physical appearance, uniformity, composition, and/or manufacturing type of the scrap pieces 101. The vision system 110 captures images of each of the scrap pieces 101, for example, by using an optical sensor as utilized in typical digital cameras and video equipment. Such images captured by the optical sensor may then be stored in a memory device as image data. In accordance with embodiments of the present disclosure, such image data represents images captured within optical wavelengths of light (i.e., the wavelengths of light that are observable by the typical human eye). However, alternative embodiments of the present disclosure may utilize optical sensors that are configured to capture an image of a material made up of wavelengths of light outside of the visual wavelengths of the typical human eye.

Additionally, such a vision system 110 may be configured to identify which of the scrap pieces 101 are not of the kind to be sorted by the sorting system 100 (e.g., scrap pieces classified as other than specified valuable scrap pieces), and send a signal to reject such scrap pieces. Such identified scrap pieces 101 may be ejected utilizing one of the mechanisms as described herein for physically moving sorted scrap pieces into individual bins.

Figure 2:
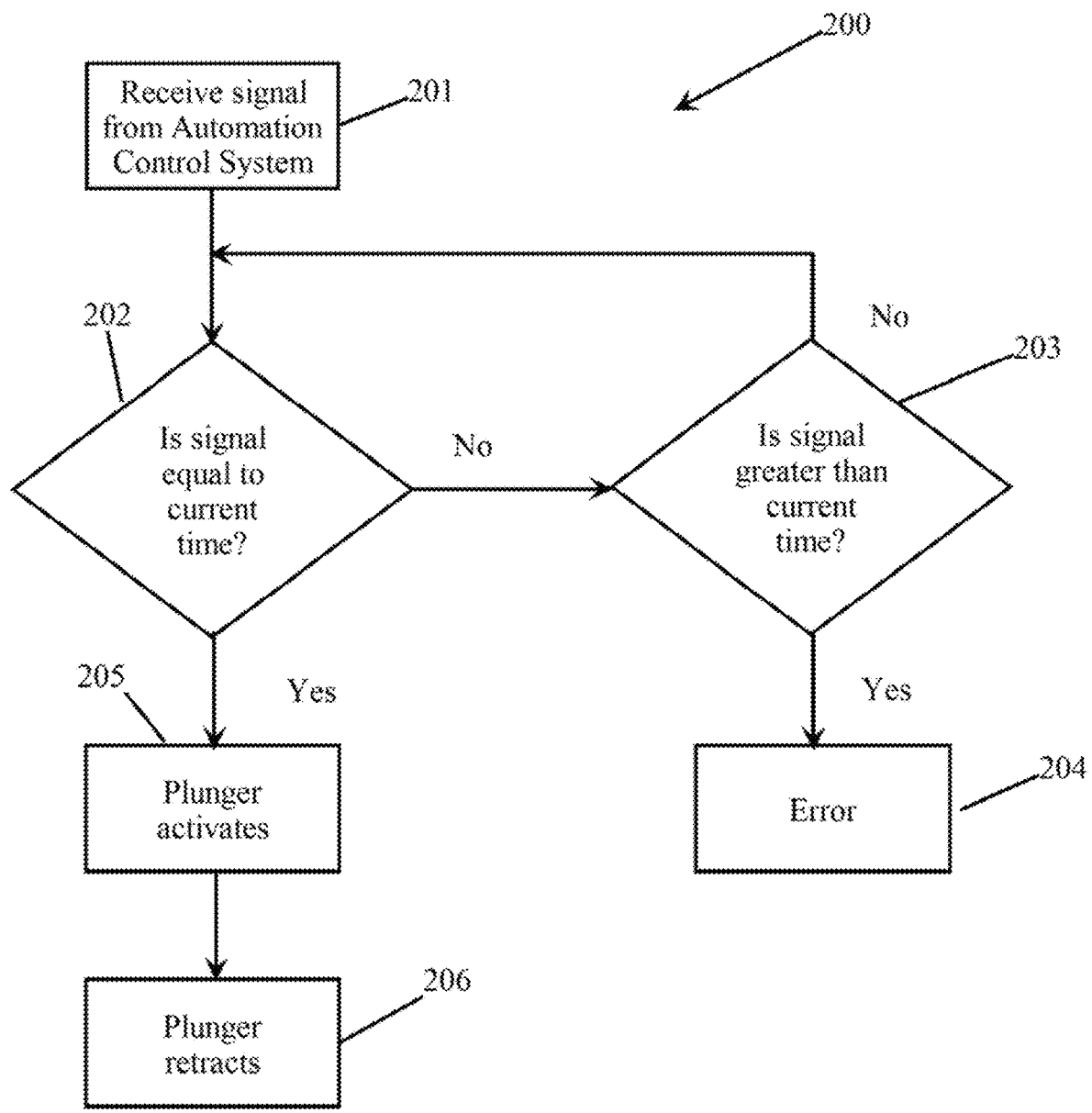
FIG. 2 illustrates a flowchart diagram of an operation of a sorting device configured in accordance with embodiments of the present disclosure.

Referring next to FIG. 2, there is illustrated a system and process 200 for activation of each one of the automatic sorting devices (e.g., the sorting devices 126, 127, 128, 129) for ejecting a classified scrap piece into a sorting bin. Such a system and process 200 may be implemented within the automation control system 108 previously described with respect to FIG. 1, or within an overall computer system (e.g., the computer system 107) controlling the sorting system. In the process block 201, a signal is received from the automation control system 108 that a specified and tracked scrap piece is in position for sorting. In the process block 202, a determination is made whether the timing associated with this signal is equal to the current time. The system and process 200 determines whether the timing associated with the classified scrap piece corresponds to the expected time in which the classified scrap piece is passing within the proximity of the particular sorting device (e.g., air jet, pneumatic plunger, paint brush type plunger, etc.) associated with the classification pertaining to the classified scrap piece. If the timing signals do not correspond, a determination is made in the process block 203 whether the signal is greater than the current time. If YES, the system may return an error signal 204. In such an instance, the system may not be able to eject the piece into the appropriate bin. Once the system and process 200 determines that a classified scrap piece is passing within the vicinity of a sorting device associated with that classification, it will activate that sorting device in the process block 205 in order to eject the classified scrap piece into the sorting bin associated with that classification. This may be performed by activating a pneumatic plunger, paint brush type plunger, air jet, etc. In the process block 206, the selected sorting device is then deactivated.

As previously noted, the sorting devices may include any well-known mechanisms for redirecting selected scrap pieces towards a desired location, including, but not limited to, ejecting the scrap pieces from the conveyor belt system into the plurality of sorting bins. For example, a sorting device may utilize air jets, with each of the air jets assigned to one or more of the classifications. When one of the air jets (e.g., 127) receives a signal from the automation control system 108, that air jet emits a stream of air that causes a scrap piece 101 to be ejected from the conveyor belt 103 into a sorting bin (e.g., 137) corresponding to that air jet. High speed air valves (e.g., commercially available from Mac Industries) may be used, for example, to supply the air jets with an appropriate air pressure configured to eject the scrap pieces 101 from the conveyor belt 103.

Although the example illustrated in FIG. 1 uses air jets to eject scrap pieces, other mechanisms may be used to eject the scrap pieces, such as robotically removing the scrap pieces from the conveyor belt, pushing the scrap pieces from the conveyor belt (e.g., with paint brush type plungers), causing an opening (e.g., a trap door) in the conveyor belt from which a scrap piece may drop, using one or more air jets to separate the scrap pieces into separate bins as they fall from the edge of the conveyor belt, or using robotic arms and grapples to pick specified scrap pieces from the conveyor belt 103.

In addition to the N sorting bins 136, 137, 138, 139 into which scrap pieces 101 are ejected, the system 100 may also include a receptacle or bin 140 that receives scrap pieces 101 not ejected from the conveyor belt 103 into any of the aforementioned sorting bins 136, 137, 138, 139. For example, a scrap piece 101 may not be ejected from the conveyor belt 103 into one of the N sorting bins 136, 137, 138, 139 when the classification of the scrap piece 101 is not determined (or simply because the sorting devices failed to adequately eject a piece). Thus, the bin 140 may serve as a default receptacle into which unclassified scrap pieces are dumped. Alternatively, the bin 140 may be used to receive one or more classifications of scrap pieces that have deliberately not been assigned to any of the N sorting bins 136, 137, 138, 139. For example, in accordance with embodiments of the present disclosure, scrap pieces not classified as specified valuable scrap pieces may be allowed to pass into the bin 140.

In accordance with certain embodiments of the present disclosure, a set of one or more air jets may be configured to direct scrap pieces classified as specified valuable scrap pieces into a first receptacle as they drop off of the edge of the conveyor belt 103, while those scrap pieces not classified as the specified valuable scrap pieces are permitted to merely drop off of the edge of the conveyor belt 103 into a separate second receptacle (e.g., bin 140). Or, the reverse may be performed where the scrap pieces classified as the specified valuable scrap pieces are permitted to merely drop off of the edge of the conveyor belt 103.

In accordance with certain embodiments of the present disclosure, monetary coins may be separately classified based on their different denominations, and therefore sorted into separate bins accordingly.

Depending upon the variety of classifications of scrap pieces desired, multiple classifications (e.g., certain different denominations of monetary coins) may be mapped to a single sorting device and associated sorting bin. In other words, there need not be a one-to-one correlation between classifications and sorting bins. For example, it may be desired by the user to sort certain classes or types of materials (e.g., one or more different denominations of monetary coins, or both monetary coins and copper and/or brass, etc.) into the same sorting bin. To accomplish this sort, when a scrap piece 101 is classified as falling into a predetermined grouping of classifications (e.g., one or more different denominations of monetary coins, or both monetary coins and copper and/or brass, etc.), the same sorting device may be activated to sort these into the same sorting bin. Such combination sorting may be applied to produce any desired combination of sorted scrap pieces. The mapping of classifications may be programmed by the user (e.g., using the sorting algorithm (e.g., see FIG. 4) operated by the computer system 107) to produce such desired combinations. Additionally, the classifications of scrap pieces are user-definable, and not limited to any particular known classifications of scrap pieces.

As a non-limiting example of the foregoing, the machine learning system of the present disclosure may be configured to separately classify two or more monetary coin denominations for sorting into the same bin (e.g., one or more of the bins 136, 137, 138, 139), or to classify certain denomination(s) (e.g., U.S. pennies) for sorting in the same bin as the scrap pieces not classified as monetary coins.

In another non-limiting example of the foregoing, the machine learning system of the present disclosure may be configured to classify and sort both monetary coins and another class or type of valuable into a common bin. The other class(es) or type(s) of valuable(s) may be jewelry (e.g., rings, earrings, parts of bracelets, parts of necklaces, etc., such as shown in FIG. 3C), pieces of specified classes or types of metals (e.g., gold, silver, copper, brass, etc.), and/or any scrap pieces that are identified by the machine learning system to contain certain specified metals (e.g., PCBs that can contain copper, gold, or silver). Then, such scrap pieces collected into a common bin may be passed through the system 100 again (or such scrap pieces may be conveyed to a second similar system like the system 100, such as further disclosed herein) in order to sort apart the collected valuable scrap pieces (e.g., sort between monetary coins and copper and/or brass).

The conveyor system 103 may include a circular conveyor (not shown) so that unclassified scrap pieces (or scrap pieces of two or more classes or types of materials for sorting again) are returned to the beginning of the sorting system 100 to be run through the system 100 again. Moreover, because the system 100 is able to specifically track each scrap piece 101 as it travels on the conveyor system 103, some sort of sorting device (e.g., the sorting device 129) may be implemented to eject a scrap piece 101 that the system 100 has failed to classify (e.g., as a monetary coin, jewelry, PCB, PCB and jewelry, etc.) after a predetermined number of cycles through the sorting system 100.

Within certain embodiments of the present disclosure, the conveyor belt 103 may be divided into multiple belts configured in series such as, for example, two belts, where a first belt conveys the scrap pieces past the vision system, and a second belt conveys the scrap pieces from the vision system to the sorting devices. Moreover, such a second conveyor belt may be at a lower elevation than the first conveyor belt, such that the scrap pieces fall from the first belt onto the second belt.

As previously noted, embodiments of the present disclosure may implement one or more vision systems (e.g., vision system 110) in order to identify, track, and/or classify scrap pieces. Such a vision system may be configured with one or more devices for capturing or acquiring images of the scrap pieces as they pass by on a conveyor system. The devices may be configured to capture or acquire any desired range of wavelengths reflected by the scrap pieces, including, but not limited to, visible, infrared ("IR"), ultraviolet ("UV") light. For example, the vision system may be configured with one or more cameras (still and/or video, either of which may be configured to capture two-dimensional, three-dimensional, and/or holographical images) positioned in proximity (e.g., above) the conveyor system so that visual images of the scrap pieces are captured as they pass by the vision system(s).

Regardless of the type(s) of images captured of the scrap pieces, the images may then be sent to a computer system (e.g., computer system 107) to be processed by a machine learning system in order to identify and/or classify each of the scrap pieces for subsequent sorting of the scrap pieces in a desired manner. Such a machine learning system may implement one or more any well-known machine learning algorithms, including one that implements a neural network (e.g., artificial neural network, deep neural network, convolutional neural network, recurrent neural network, autoencoders, reinforcement learning, etc.), fuzzy logic, artificial intelligence ("AI"), deep learning algorithms, deep structured learning hierarchical learning algorithms, support vector machine ("SVM") (e.g., linear SVM, nonlinear SVM, SVM regression, etc.), decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.) and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning algorithms, software, and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, CudaConvnet (a fast C++/CUDA implementation of convolutional (or more generally, feed-forward) neural networks), Deep Belief Networks, RNNLM, RNNLIB-RNNLIB, matrbm, deeplearning4j, Eblearn.1sh, deepmat, MShadow, Matplotlib, SciPy, CXXNET, Nengo-Nengo, Eblearn, cudamat, Gnumpy, 3-way factored RBM and mcRBM, mPoT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

Machine learning often occurs in two stages, or phases. For example, first, training occurs offline in that the sorting system 100 is not being utilized to perform actual sorting of scrap pieces. In accordance with certain embodiments of the present disclosure, a portion of the system 100 may be utilized to train the machine learning system in that one or more homogenous sets of scrap pieces (i.e., monetary coins of one or more denominations (e.g., see FIG. 3A), exemplary sets of rings, bracelets, necklaces, and/or earrings, exemplary scrap pieces of PCBs, or exemplary scrap pieces of certain types of precious metals (e.g., gold, silver, copper, brass, etc.)) are passed by the vision system 110 using the conveyor system 103 (each set of homogenous scrap pieces is not sorted, but may be collected in a common bin (e.g., bin 140)). Alternatively, the training may be performed at another location remote from the system 100, including using some other mechanism for collecting images of homogenous sets of specified valuable scrap pieces.

Note that, in accordance with certain embodiments of the present disclosure, a homogeneous set of monetary coins may be a collection of monetary coins of the same denomination (and thus having the same shape, size, color, hue, etc.), or may be a collection of monetary coins of different denominations (and thus having different shapes, sizes, colors, or hues, etc.), but sharing at least one physical characteristic that is the same or substantially the same, such as shape (e.g., circular, polygonal). Furthermore, in accordance with certain embodiments of the present disclosure, since most monetary coins are substantially circular, this may be a particular physical characteristic utilized by the machine learning system to classify and sort materials. Since there are some foreign coins that are not circular (for example, having a polygonal shape), such particular non-circular shapes (but yet of a substantially polygonal (e.g., octagonal) shape) may also be utilized by the machine learning system to classify and sort materials. For purposes of describing various embodiments of the present disclosure, it is understood that most monetary coins have a closed geometric shape (e.g., circle, polygon).

During this training stage, the machine learning algorithm(s) extract features from the captured images using image processing techniques well known in the art. Non-limiting examples of training algorithms include, but are not limited to, linear regression, gradient descent, feed forward, polynomial regression, learning curves, regularized learning models, and logistic regression. It is during this training stage that the machine learning algorithm(s) may be configured to learn the relationships between specified valuable scrap pieces (e.g., monetary coins (which may include different denominations), rings, bracelets, necklaces, earrings, PCBs, etc.) and their features (e.g., as captured by the images, such as color, texture, hue, shape (e.g., circular, polygonal), brightness, etc.), creating a knowledge base for later classification of a heterogeneous mixture of scrap pieces received by the sorting system 100 for sorting monetary coins from the heterogeneous mixture of scrap pieces. In accordance with certain embodiments of the present disclosure, such a knowledge base may include a requirement that scrap pieces to be classified as monetary coins have a substantially circular and/or polygonal shape (e.g., within a predetermined threshold of being substantially circular and/or polygonal since the coins may have become somewhat damaged within the vehicles or by an automobile shredder, such as shown by some of the coins in FIG. 3A). Such a knowledge base may include a rejection of circular scrap pieces having a hole formed therein in order to not classify metal washers as monetary coins. Such a knowledge based may further include a rejection of circular scrap pieces having a certain color or hue (e.g., in order to not sort U.S. pennies with other monetary coins).

Such a knowledge base may include one or more libraries, wherein each library includes parameters for utilization by the vision system 110 in classifying and sorting scrap pieces during the second stage or phase. For example, one particular library may include parameters configured by the training stage to recognize and classify a particular denomination of monetary coin. In accordance with certain embodiments of the present disclosure, such libraries may be inputted into the vision system and then the user of the system 100 may be able to adjust certain ones of the parameters in order to adjust an operation of the system 100 (for example, adjusting the threshold effectiveness of how well the vision system recognizes a particular denomination of monetary coin from a heterogeneous mixture of materials (e.g., see FIG. 3B)).

For example, FIG. 3A shows captured or acquired images of a homogenous set of exemplary monetary coins that may be used during the aforementioned training stage. During the training stage, a plurality of such monetary coins, which are the control samples (e.g., a homogenous set of exemplary monetary coins of one or more specified denominations), may be delivered past the vision system (e.g., by the conveyor system 103) so that the machine learning system detects, extracts, and learns what features visually represent such exemplary monetary coins. In other words, images of monetary coins such as shown in FIG. 3A may be first passed through such a training stage so that the machine learning system "learns" how to detect, recognize, and classify monetary coins among a heterogeneous mixture of scrap pieces (e.g., such as shown in FIGS. 3B and 3D). This creates a library of parameters particular to specified monetary coins.

A point of mention here is that the detected/extracted features are not necessarily simply colors, or brightness, or circular or polygonal shapes; they can be abstract formulations that can only be expressed mathematically, or not mathematically at all; nevertheless, the machine learning system parses all of the data to look for patterns that allow the control samples (e.g., actual monetary coins) to be classified during the training stage. The machine learning system may take subsections of a captured image of a scrap piece and attempt to find correlations between the predefined classifications (e.g., one or more various monetary coin denominations).

In accordance with certain embodiments of the present disclosure, the machine learning system may be configured so that it classifies as monetary coins those scrap pieces that are nearly circular but not exactly circular. For example, when monetary coins contained within a scrap yard vehicle are processed (for example, run through a shredder), they may become damaged (e.g., slightly bent or a notch formed therein). FIG. 3A shows examples of some such damaged coins. The machine learning system may have its tolerance parameters adjusted to classify such scrap pieces as monetary coins. For example, a scrap piece is classified as a monetary coin even though it is not perfectly circular or does not have a completely closed circular shape, but its overall size (e.g., diameter) and/or color, hue, texture, etc. matches with a certain denomination of monetary coin (e.g., a U.S. quarter, nickel, dime, etc.). Alternatively, the machine learning system may be trained to classify scrap pieces as monetary coins by including exemplary samples of damaged (e.g., notched, bent, etc.) coins within the aforementioned control samples (see FIG. 3A).

Furthermore, since there are non-U.S. monetary coins that are not circular in shape, but may have some other polygonal shape, the machine learning system of the present disclosure may be configured to classify such objects in a stream of scrap pieces as monetary coins.

Since some scrap to be sorted may be produced from materials that include metal electrical boxes, the scrap pieces may include circular knockouts, which look similar to monetary coins. However, a machine learning system configured in accordance with embodiments of the present disclosure can be configured to not classify such knockouts as monetary coins. This may be accomplished by passing a homogenous set of such knockouts through the machine learning system during the training stage. The machine learning system may "learn" to not classify such knockouts as monetary coins by how the knockouts have a different appearance from monetary coins, such as their texture, color, the lack of a stamped pattern on their face, etc.

In accordance with certain embodiments of the present disclosure, the machine learning system may be configured to not classify as monetary coins any circular-shaped scrap piece that does not have a diameter equivalent to one or more specified monetary coins (e.g., a U.S. quarter, nickel, dime, etc.), including but not limited to, any scrap piece with a diameter that is greater than and/or less than a predetermined diameter. This, for example, could result in clothing buttons not classified as monetary coins. Such diameter specifications may be utilized to sort monetary coins by denomination.

In accordance with certain embodiments of the present disclosure, training of the machine learning system to identify monetary coins for sorting using a homogenous set of exemplary coins (e.g., see FIG. 3A) enables the machine learning system 100 to sort specified monetary coins from a heterogeneous mixture of scrap pieces (e.g., see FIG. 3B).

In accordance with certain embodiments of the present disclosure, the machine learning system may be trained to identify specified types of jewelry by passing exemplary samples of jewelry pieces (e.g., see FIG. 3C) through the machine learning system as previously disclosed in order to enable the machine learning system 100 to sort specified jewelry scrap pieces from a heterogeneous mixture of scrap pieces (e.g., see FIG. 3D). As previously disclosed, the machine learning system is capable of identifying and sorting jewelry scrap pieces from such a heterogeneous mixture of scrap pieces by learning the particular physical characteristics of such specified jewelry scrap pieces. FIG. 3D provides a non-limiting example of how such jewelry scrap pieces can be visually distinguished from other scrap pieces.

Though not shown in the figures, exemplary pieces of PCBs may be run through a machine learning system as a homogenous set in order to enable the machine learning system 100 to identify and sort out such PCB scrap pieces from a heterogeneous mixture of scrap pieces. For example, the machine learning system may do so by looking for scrap pieces that are green or appear like green plastic boards.

Figure 6:
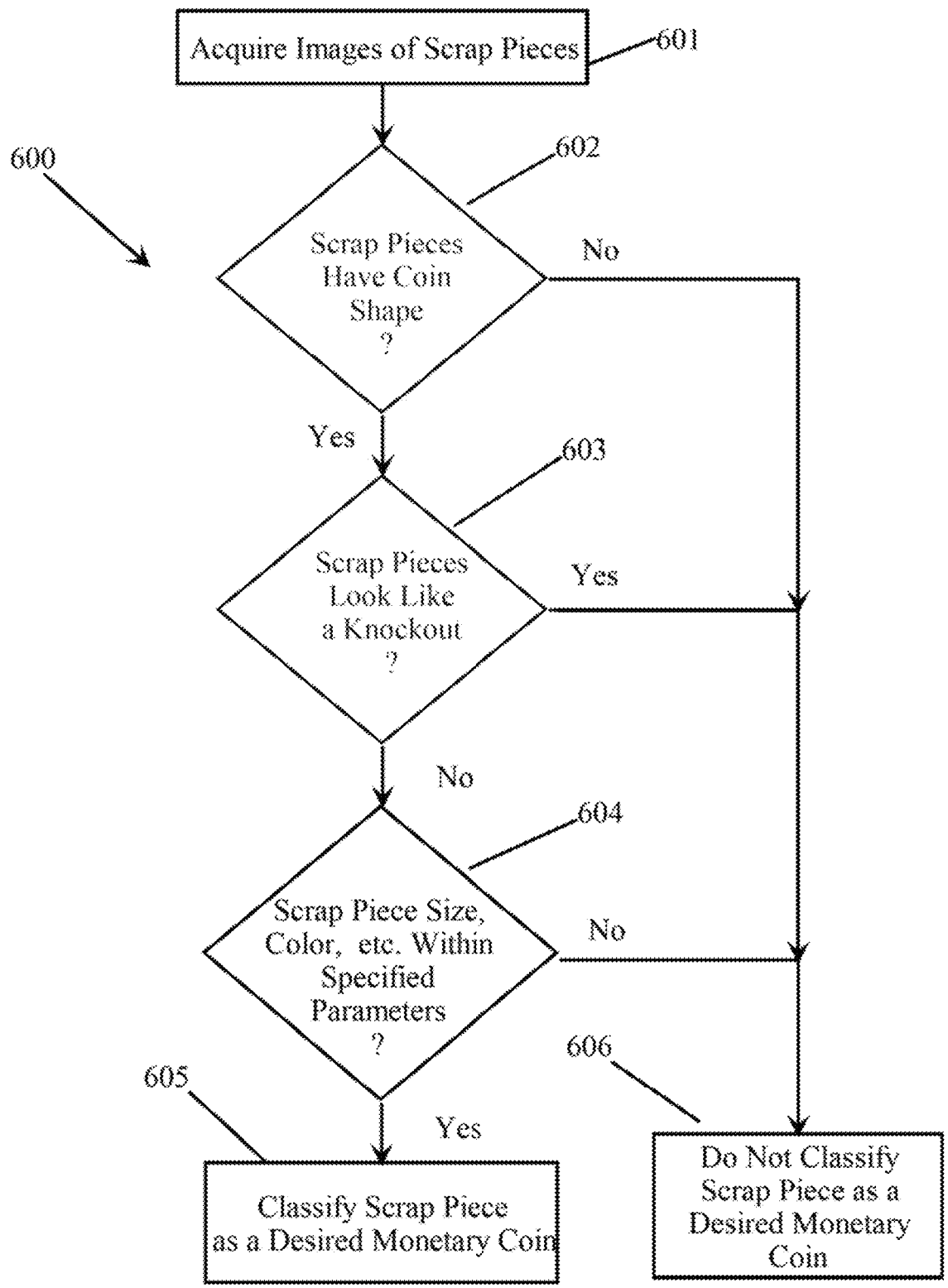
FIG. 6 illustrates a flowchart diagram of exemplary configurations for a machine learning system in accordance with embodiments of the present disclosure.

FIG. 6 represents at an abstract level examples of various possible embodiments of the present disclosure. A machine learning algorithm, or algorithms, may essentially embody one or more aspects of the system and process 600, though not necessarily exactly as outlined in the flow diagram of FIG. 6.

In the block 601, the vision system 110 acquires images of the scrap pieces 101 as described herein. Block 602 abstractly represents that the machine learning system may be configured to identify those scrap pieces that resemble certain specified valuable scrap pieces (e.g., monetary coins, whether they be circular or of a polygonal shape). Other physical features (e.g., color, tint, hue, texture, stamped features, diameter, etc.) may be utilized to identify specified features (e.g., coin-related) in the scrap pieces 101.

Optional block 603 abstractly represents how the machine learning system may be configured to exclude from the monetary coin classification those scrap pieces 101 that look similar to (i.e., have physical characteristics similar to) electrical box knockouts.

Optional block 604 abstractly represents how the machine learning system may be further configured to not classify as monetary coins those scrap pieces that are not of a desired denomination to be sorted (e.g., have the color of a U.S. penny, are smaller than a dime, are larger than a quarter, etc.) Block 604 also abstractly represents how the machine learning system may separately sort different denominations of monetary coins.

After the machine learning algorithms have been established and the machine learning system has sufficiently learned the differences for the material classifications, the libraries for the different classes or types of materials (e.g., one or more monetary coin denominations, rings, bracelets, necklaces, earrings, PCBs, etc.) are then implemented into the material sorting system (e.g., the system 100) to be used for identifying and/or classifying and then sorting specified scrap pieces from a heterogeneous mixture of scrap pieces.

Figure 4:
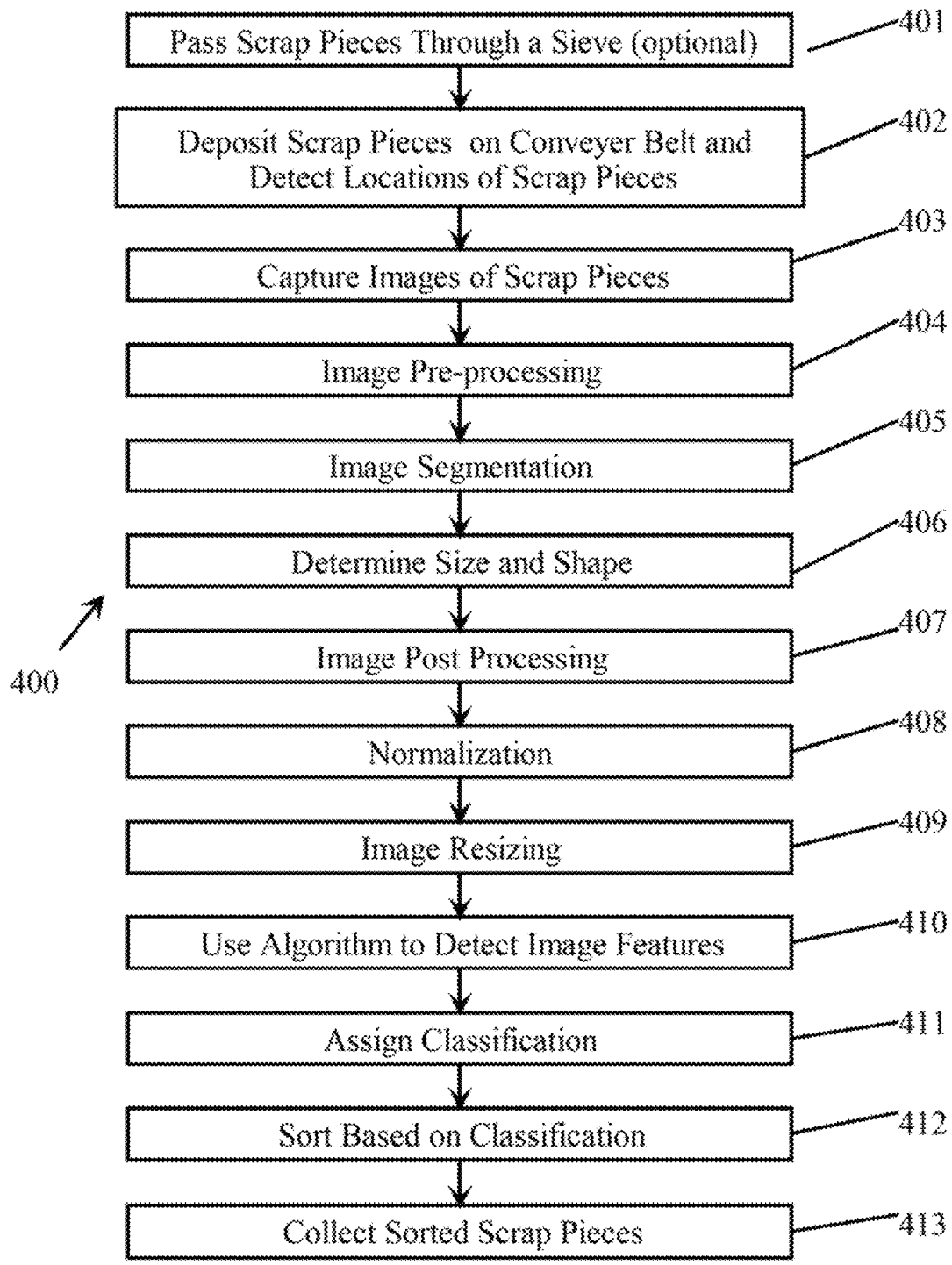
FIG. 4 illustrates a flowchart diagram configured in accordance with embodiments of the present disclosure.

FIG. 4 illustrates a flowchart diagram depicting exemplary embodiments of a process 400 of sorting scrap pieces utilizing a vision system in accordance with certain embodiments of the present disclosure. Aspects of the process 400 may be configured to operate within any of the embodiments of the present disclosure described herein, including the sorting system 100 of FIG. 1. Operation of the process 400 may be performed by hardware and/or software, including within a computer system (e.g., computer system 3400 of FIG. 5) controlling the sorting system (e.g., the computer system 107 and/or the vision system 110 of FIG. 1). In the optional process block 401, the scrap pieces may be passed through some sort of well-known sieve (not shown), which may be configured so that scrap pieces smaller than a predetermined size are permitted to pass through the sieve. For example, slots formed in the sieve may be configured to pass objects with similar sizes as monetary coins. However, any device or even another sorting system as described herein may be utilized to first separate smaller scrap pieces from larger ones.

In the process block 402, the scrap pieces may be deposited onto a conveyor belt. FIG. 3B shows a digital photograph of an exemplary heterogeneous collection of such scrap pieces, including various monetary coins, deposited onto a conveyor belt. FIG. 3A shows a digital photograph of an exemplary heterogeneous collection of scrap pieces, including various jewelry scrap pieces, deposited onto a conveyor belt. In a non-limiting example, the sieve may be located so that the scrap pieces that pass through deposit onto the conveyor belt. For example, referring to FIG. 1, such a sieve may be positioned between the ramp or chute 102 and the conveyor belt 103. The location on the conveyor belt 103 of each scrap piece 101 is detected for tracking of each scrap piece as it travels through the sorting system. This may be performed by the vision system 110 (for example, by distinguishing a scrap piece from the underlying conveyor belt material while in communication with a conveyor belt speed detector (e.g., the belt speed detector 105)), and this information is collected and monitored by the automation control system 108. Alternatively, a linear sheet laser beam can be used to locate the pieces, (or, any system that can create a light source (including, but not limited to, visual light, UV, VIS, and IR) and have a detector that can be used to locate the pieces). In the process block 403, when a scrap piece has traveled in proximity to the vision system 110, one or more images of the scrap piece are captured/acquired. In the process block 404, a machine learning system, such as previously disclosed, may perform pre-processing of the images, which may be utilized to detect or discern (extract) each of the scrap pieces from the background (e.g., the conveyor belt 103). In other words, the image pre-processing may be utilized to identify the difference between the scrap piece and the background. Well-known image processing techniques such as dilation, thresholding, and contouring may be utilized to identify the scrap piece as being distinct from the background. In the process block 405, image segmentation may be performed. For example, one or more of the images captured by the camera of the vision system may include images of one or more scrap pieces. Additionally, a particular scrap piece may be located on a seam of the conveyor belt when its image is captured. Therefore, it may be desired in such instances to isolate the image of an individual scrap piece from the background of the image. In an exemplary technique for the process block 405, a first step is to apply a high contrast of the image; in this fashion, background pixels are reduced to substantially all black pixels, and at least some of the pixels pertaining to the scrap piece are brightened to substantially all white pixels. The image pixels of the scrap piece that are white are then dilated to cover the entire size of the scrap piece. After this step, the location of the scrap piece is a high contrast image of all white pixels on a black background. Then, a contouring algorithm can be utilized to detect boundaries of the scrap piece. The boundary information is saved, and the boundary locations are then transferred to the original image. Segmentation is then performed on the original image on an area greater than the boundary that was earlier defined. In this fashion, each scrap piece is identified and separated from the background. In the process block 406, the size and shape of each scrap piece may be determined.

In the process block 407, image post processing may be performed. Image post processing may involve resizing the image to prepare it for use in the neural networks. This may also include modifying certain image properties (e.g., enhancing image contrast, changing the image background, or applying filters) in a manner that will yield an enhancement to the capability of the machine learning system to classify the scrap pieces. Subsequent to image post processing, normalization of the various images may be performed in the process block 408 so that the images of the various different scrap pieces can be more easily compared to each other. In the process block 409, the data representing each of the images may be resized. Image resizing may be necessary under certain circumstances to match the data input requirements for certain machine learning systems, such as neural networks. Neural networks require much smaller image sizes (e.g., 225×255 pixels or 299×299 pixels) than the sizes of the images captured by typical digital cameras. Moreover, the smaller the image size, the less processing time is needed to perform the classification. Thus, smaller image sizes can ultimately increase the throughput of the sorter system and increase its value.

In the process blocks 410 and 411, each scrap piece is identified/classified based on the detected features. For example, the process block 410 may be configured with a neural network employing one or more machine learning algorithms, which compare the extracted features (e.g., circular/polygonal shape, no hole, color, etc.) with those stored in the knowledge base generated during the training stage, and assign the classification with the highest match to each of the scrap pieces based on such a comparison. The machine learning algorithm(s) may process the captured image in a hierarchical manner by using automatically trained filters. The filter responses are then successfully combined in the next level(s) of the algorithm(s) until a probability is obtained in the final step. In the process block 411, these probabilities may be used for each of the N (N≥1) classifications to decide into which of the N sorting bins the respective scrap pieces should be sorted. For example, each of the N classifications may be assigned to a respective sorting bin, and the scrap piece under consideration is sorted into that bin that corresponds to the classification returning the highest probability larger than a predefined threshold. Within embodiments of the present disclosure, such predefined thresholds may be preset by the user. A particular scrap piece may be sorted into an outlier bin (e.g., sorting bin 140) if none of the probabilities is larger than the predetermined threshold (e.g., the scrap piece is not classified as a monetary coin).

In the process block 412, a sorting device corresponding to the classification, or classifications, of the scrap piece is activated (e.g., see FIG. 2). Between the time at which the image of the scrap piece 101 was captured by the vision system 110 and the time at which the sorting device is activated, the scrap piece 101 has moved from the proximity of the vision system 110 to a location downstream on the conveyor belt 103, at the rate of conveying of the conveyor belt 103. In embodiments of the present disclosure, the activation of the sorting device (e.g., 126, 127, 128, 129) is timed such that as the scrap piece 101 passes the sorting device mapped to the classification of the scrap piece, the sorting device is activated, and the scrap piece is directed into its associated sorting bin (e.g., 136, 137, 138, 139). Within embodiments of the present disclosure, the activation of a sorting device may be timed by the automation control system in communication with the belt speed detector 105 that detects when a scrap piece is passing before the sorting device and sends a signal to enable the activation of the sorting device. In the process block 413, the sorting bin corresponding to the sorting device that was activated receives the directed scrap piece.

In accordance with certain embodiments of the present disclosure, a plurality of at least a portion of the system 100 may be linked together in succession in order to perform multiple iterations or layers of sorting. For example, when two or more systems 100 are linked in such a manner, the conveyor system may be implemented with a single conveyor belt, or multiple conveyor belts, conveying the scrap pieces past a first vision system configured for sorting scrap pieces of a first set of a heterogeneous mixture of materials by a sorter (e.g., the first automation control system 108 and associated one or more sorting devices 126, 127, 128, 129) into a first set of one or more receptacles (e.g., sorting bins 136, 137, 138, 139), and then conveying the scrap pieces past a second vision system configured for sorting scrap pieces of a second set of a heterogeneous mixture of materials by a second sorter into a second set of one or more sorting bins.

Such successions of systems 100 can contain any number of such systems linked together in such a manner. In accordance with certain embodiments of the present disclosure, each successive vision system may be configured to sort out a different material than previous vision system(s) (e.g., initially sort coins and copper/brass from scrap, then sort between the coins and the copper/brass pieces).

As has been described herein, embodiments of the present disclosure may be implemented to perform the various functions described for identifying, tracking, classifying, and sorting materials, such as scrap pieces. Such functionalities may be implemented within hardware and/or software, such as within one or more data processing systems (e.g., the data processing system 3400 of FIG. 5), such as the previously noted computer system 107, the vision system 110, and/or automation control system 108. Nevertheless, the functionalities described herein are not to be limited for implementation into any particular hardware/software platform.

As will be appreciated by one skilled in the art, aspects of the present disclosure may be embodied as a system, process, method, and/or program product. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM") (e.g., RAM 3420 of FIG. 5), a read-only memory ("ROM") (e.g., ROM 3435 of FIG. 5), an erasable programmable read-only memory ("EPROM" or flash memory), an optical fiber, a portable compact disc read-only memory ("CD-ROM"), an optical storage device, a magnetic storage device (e.g., hard drive 3431 of FIG. 5), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowchart and block diagrams in the figures illustrate architecture, functionality, and operation of possible implementations of systems, methods, processes, and program products according to various embodiments of the present disclosure. In this regard, each block in the flowcharts or block diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors (e.g., GPU 3401, CPU 3415) may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data (e.g., material classification libraries described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general purpose computer, special purpose computer, or other programmable data processing apparatus (e.g., controller) to produce a machine, such that the instructions, which execute via the processor(s) (e.g., GPU 3401, CPU 3415) of the computer or other programmable data processing apparatus, create circuitry or means for implementing the functions/acts specified in the flowchart and/or block diagram block or blocks.

It will also be noted that each block of the block diagrams and/or flowchart illustrations, and combinations of blocks in the block diagrams and/or flowchart illustrations, can be implemented by special purpose hardware-based systems (e.g., which may include one or more graphics processing units (e.g., GPU 3401, CPU 3415)) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

Computer program code, i.e., instructions, for carrying out operations for aspects of the present disclosure may be written in any combination of one or more programming languages, including an object oriented programming language such as Java, Smalltalk, Python, C++, or the like, conventional procedural programming languages, such as the "C" programming language or similar programming languages, or any of the machine learning software disclosed herein. The program code may execute entirely on the user's computer system, partly on the user's computer system, as a stand-alone software package, partly on the user's computer system (e.g., the computer system utilized for sorting) and partly on a remote computer system (e.g., the computer system utilized to train the machine learning system), or entirely on the remote computer system or server. In the latter scenario, the remote computer system may be connected to the user's computer system through any type of network, including a local area network ("LAN") or a wide area network ("WAN"), or the connection may be made to an external computer system (for example, through the Internet using an Internet Service Provider). As an example of the foregoing, various aspects of the present disclosure may be configured to execute on one or more of the computer system 107, automation control system 108, and the vision system 110.

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data (e.g., for each of the scrap pieces processed by a sorting system described herein) may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Reference is made herein to "configuring" a device or a device "configured to" perform some function. It should be understood that this may include selecting predefined logic blocks and logically associating them, such that they provide particular logic functions, which includes monitoring or control functions. It may also include programming computer software-based logic of a retrofit control device, wiring discrete hardware components, or a combination of any or all of the foregoing. Such configured devices are physically designed to perform the specified function.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

Figure 5:
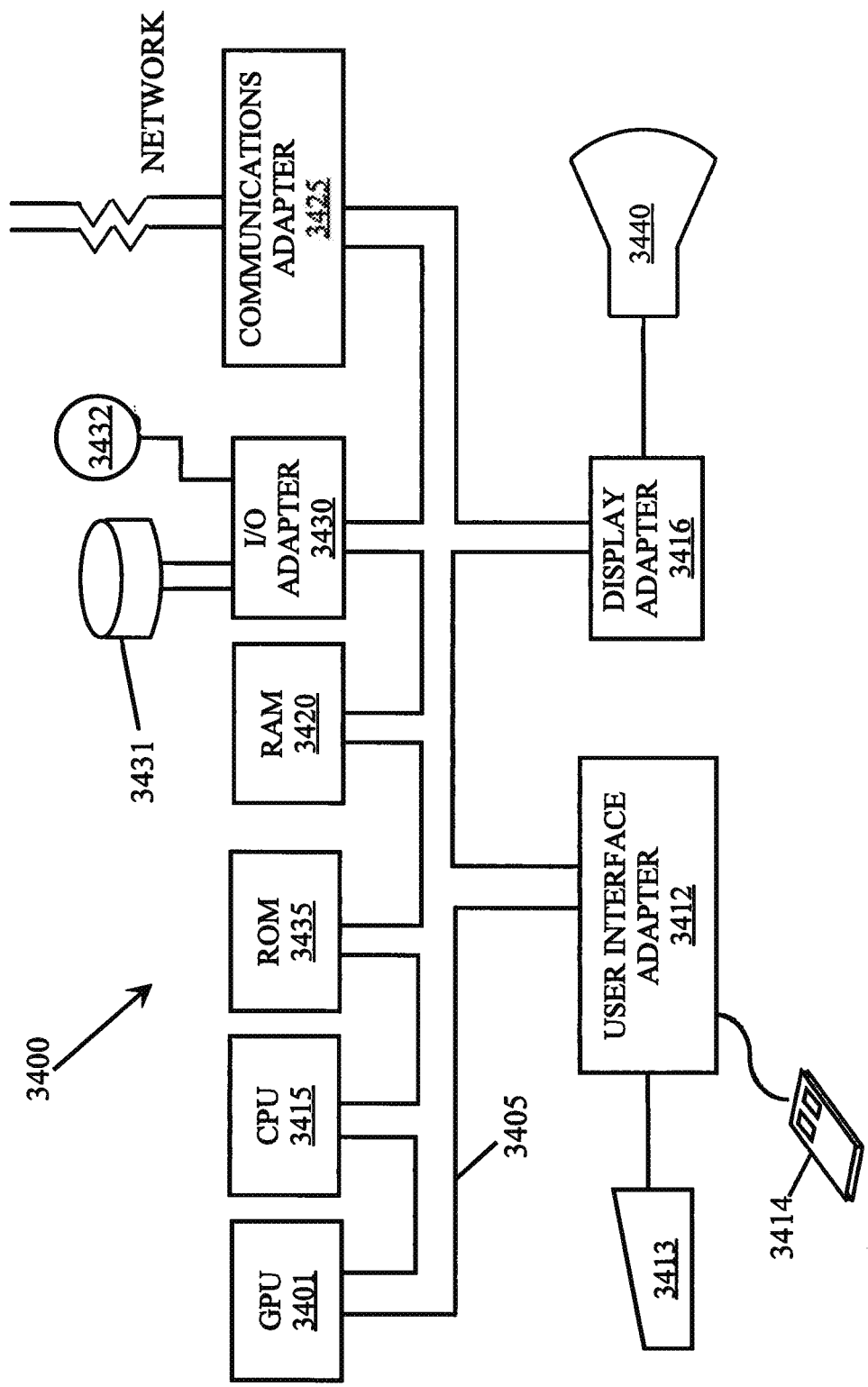
FIG. 5 illustrates a block diagram of a data processing system configured in accordance with embodiments of the present disclosure.

With reference now to FIG. 5, a block diagram illustrating a data processing ("computer") system 3400 is depicted in which aspects of embodiments of the disclosure may be implemented. (The terms "computer," "system," "computer system," and "data processing system" may be used interchangeably herein.) The computer system 107, the automation control system 108, and/or the vision system 110 may be configured similarly as the computer system 3400. The computer system 3400 may employ a local bus 3405 (e.g., a peripheral component interconnect ("PCI") local bus architecture). Any suitable bus architecture may be utilized such as Accelerated Graphics Port ("AGP") and Industry Standard Architecture ("ISA"), among others. One or more processors 3415, volatile memory 3420, and non-volatile memory 3435 may be connected to the local bus 3405 (e.g., through a PCI Bridge (not shown)). An integrated memory controller and cache memory may be coupled to the one or more processors 3415. The one or more processors 3415 may include one or more central processor units and/or one or more graphics processor units and/or one or more tensor processing units. In certain embodiments of the present disclosure, one or more GPUs 3401 (e.g., a GPGPU, or general purpose computing on graphics processing unit) may be implemented within the computer system 107 to operate any one or more of the machine learning systems disclosed herein. Additional connections to the local bus 3405 may be made through direct component interconnection or through add-in boards. In the depicted example, a communication (e.g., network (LAN)) adapter 3425, an I/O (e.g., small computer system interface ("SCSI") host bus) adapter 3430, and expansion bus interface (not shown) may be connected to the local bus 3405 by direct component connection. An audio adapter (not shown), a graphics adapter (not shown), and display adapter 3416 (coupled to a display 3440) may be connected to the local bus 3405 (e.g., by add-in boards inserted into expansion slots).

The user interface adapter 3412 may provide a connection for a keyboard 3413 and a mouse 3414, modem (not shown), and additional memory (not shown). The I/O adapter 3430 may provide a connection for a hard disk drive 3431, a tape drive 3432, and a CD-ROM drive (not shown).

An operating system may be run on the one or more processors 3415 and used to coordinate and provide control of various components within the computer system 3400. In FIG. 5, the operating system may be a commercially available operating system. An object-oriented programming system (e.g., Java, Python, etc.) may run in conjunction with the operating system and provide calls to the operating system from programs or programs (e.g., Java, Python, etc.) executing on the system 3400. Instructions for the operating system, the object-oriented operating system, and programs may be located on non-volatile memory 3435 storage devices, such as a hard disk drive 3431, and may be loaded into volatile memory 3420 for execution by the processor 3415.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, any of the processes of the present disclosure may be applied to a multiprocessor computer system, or performed by a plurality of such systems 3400. For example, training of the vision system 110 may be performed by a first computer system 3400, while operation of the vision system 110 for sorting may be performed by a second computer system 3400.

As another example, the computer system 3400 may be a stand-alone system configured to be bootable without relying on some type of network communication interface, whether or not the computer system 3400 includes some type of network communication interface. As a further example, the computer system 3400 may be an embedded controller, which is configured with ROM and/or flash ROM providing non-volatile memory storing operating system files or user-generated data.

The depicted example in FIG. 5 and above-described examples are not meant to imply architectural limitations. Further, a computer program form of aspects of the present disclosure may reside on any computer readable storage medium (i.e., floppy disk, compact disk, hard disk, tape, ROM, RAM, etc.) used by a computer system.

Reference throughout this specification to "an embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims. Further, no component described herein is required for the practice of the disclosure unless expressly described as essential or critical.

Those skilled in the art having read this disclosure will recognize that changes and modifications may be made to the embodiments without departing from the scope of the present disclosure. It should be appreciated that the particular implementations shown and described herein may be illustrative of the disclosure and its best mode and may be not intended to otherwise limit the scope of the present disclosure in any way. Other variations may be within the scope of the following claims.

While this specification contains many specifics, these should not be construed as limitations on the scope of the disclosure or of what can be claimed, but rather as descriptions of features specific to particular implementations of the disclosure. Headings herein may be not intended to limit the disclosure, embodiments of the disclosure or other matter disclosed under the headings.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the disclosure. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter. As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

What is claimed is:

1. A method comprising:
   capturing, by a camera, visual image data of each piece of a collection of materials comprising monetary coins and pieces that are not monetary coins;
   classifying certain pieces of the collection of materials as monetary coins as a function of visual characteristics obtained from the captured visual image data, wherein the visual characteristics are unique to monetary coins; and classifying a remainder of the pieces of the collection of materials as not monetary coins, wherein the classifying of the collection of materials is performed with a neural network implementing one or more machine learning algorithms previously trained to recognize the visual characteristics unique to monetary coins.

2. The method as recited in claim 1, further comprising sorting by an automated sorting device the certain pieces of the collection of materials classified as monetary coins from the remainder of the pieces of the collection of materials classified as not monetary coins.

3. The method as recited in claim 1, further comprising classifying pieces of the collection of materials having a circular shape and also having a hole formed therethrough as not monetary coins.

4. The method as recited in claim 1, wherein the classifying certain pieces of the collection of materials as monetary coins includes classifying the monetary coins into different denominations as a function of the visual characteristics.

5. The method as recited in claim 1, wherein the one or more machine learning algorithms perform the classifying of the collection of materials as a function of a knowledge base of parameters configured during a training stage to recognize the visual characteristics unique to monetary coins.

6. The method as recited in claim 5, wherein the training stage comprises processing a control sample of a plurality of one or more denominations of monetary coins through the neural network in order to create the knowledge base.

7. The method as recited in claim 6, wherein the control sample includes a damaged denomination of monetary coin that possesses a geometric shape that is altered relative to an undamaged version of the denomination of monetary coin.

8. The method as recited in claim 1, wherein the visual characteristics unique to monetary coins include features other than geometric shapes and dimensions particular to monetary coins.

9. A computer program product stored on a computer readable storage medium, which when executed by a data processing system, performs a process for classifying materials, comprising:

receiving visual image data of each piece of a collection of materials comprising pieces that are monetary coins and pieces that are not monetary coins;

classifying certain pieces of the collection of materials as monetary coins as a function of visual characteristics captured from the visual image data, wherein the visual characteristics are unique to monetary coins; and classifying a remainder of the pieces of the collection of materials as not monetary coins, wherein the classifying of the collection of materials is performed with a neural network implementing one or more machine learning algorithms previously trained to recognize the visual characteristics unique to monetary coins.

10. The computer program product as recited in claim 9, wherein the computer readable storage medium, which when executed, comprises sending to an automated sorting device information regarding the classifications used by the automated sorting device to sort the certain pieces classified as monetary coins from the remainder of pieces classified as not monetary coins.

11. The computer program product as recited in claim 9, wherein the computer readable storage medium, which when executed, comprises classifying a piece of the collection of materials having a circular shape and size similar to monetary coins as not monetary coins when the piece does not possess other visual characteristics unique to monetary coins.

12. The computer program product as recited in claim 9, wherein the one or more machine learning algorithms are configured to perform the classifying of the collection of materials as a function of a knowledge base of parameters configured during a training stage to recognize the visual characteristics unique to monetary coins, wherein the training stage comprises processing a control sample of a plurality of one or more denominations of monetary coins in order to create the knowledge base.

13. The computer program product as recited in claim 12, wherein the control sample includes a damaged denomination of monetary coin that possesses a geometric shape that is altered relative to an undamaged version of the denomination of monetary coin.

14. The computer program product as recited in claim 9, wherein the visual characteristics unique to monetary coins include features other than geometric shapes and dimensions particular to monetary coins.

15. A system comprising:
a camera suitable for capturing image data of each piece of a collection of shredded end-of-life vehicle scrap pieces comprising pieces having irregular shapes and sizes that includes monetary coins and scrap pieces that are not monetary coins; and
a machine learning system implementing one or more machine learning algorithms configured to utilize the captured image data to classify each of the pieces as either a monetary coin or a scrap piece that is not a monetary coin.

16. The system as recited in claim 15, wherein the one or more machine learning algorithms are configured to classify each of the pieces as either a monetary coin or a scrap piece that is not a monetary coin as a function of a knowledge base previously generated during a training stage, wherein the knowledge base represents visual characteristics unique to monetary coins.

17. The system as recited in claim 16, wherein during the training stage, the machine learning system is configured to process image data captured from a control sample of a plurality of monetary coins in order to create the knowledge base.

18. The system as recited in claim 17, wherein the control sample includes a damaged denomination of monetary coin that possesses a geometric shape that is altered relative to an undamaged version of the denomination of monetary coin.

19. The system as recited in claim 15, wherein the one or more machine learning algorithms are configured to classify a scrap piece as not a monetary coin even when the piece has a geometric shape substantially similar to that of a monetary coin.

20. The system as recited in claim 15, further comprising an automated sorting device suitable for physically separating the pieces classified as a monetary coin from the pieces classified as not a monetary coin.

21. The system as recited in claim 15, further comprising a conveyor system suitable for moving the collection of end-of-life vehicle scrap pieces past the camera.

22. The system as recited in claim 15, wherein the one or more machine learning algorithms are configured to classify certain pieces of the collection of end-of-life vehicle scrap pieces as monetary coins of a first denomination and certain pieces of the collection of end-of-life vehicle scrap pieces as monetary coins of a second denomination, wherein the classifications are performed as a function of the processing by the one or more machine learning algorithms of the captured image data.

23. The system as recited in claim 15, wherein the visual characteristics unique to monetary coins include features other than geometric shapes and dimensions particular to monetary coins.

24. A method comprising:
- capturing, by a camera, visual image data of each piece of a collection of materials comprising monetary coins and pieces that are not monetary coins;
- classifying certain pieces of the collection of materials as monetary coins as a function of visual characteristics obtained from the captured visual image data, wherein the visual characteristics are unique to monetary coins; and
- classifying a remainder of the pieces of the collection of materials as not monetary coins, wherein the classifying certain pieces of the collection of materials as monetary coins as a function of visual characteristics obtained from the captured visual image data further comprises classifying a certain piece of the collection of materials as a monetary coin as a function of visual characteristics obtained from the captured visual image data when the certain piece possesses a geometric shape that is altered relative to an undamaged version of a monetary coin.

25. A method comprising:
- capturing, by a camera, visual image data of each piece of a collection of materials comprising monetary coins and pieces that are not monetary coins;
- classifying certain pieces of the collection of materials as monetary coins as a function of visual characteristics obtained from the captured visual image data, wherein the visual characteristics are unique to monetary coins; and
- classifying a remainder of the pieces of the collection of materials as not monetary coins, wherein the remainder of the pieces of the collection of materials classified as not monetary coins comprise shredded end-of-life vehicle scrap pieces having irregular shapes and sizes.

26. A computer program product stored on a computer readable storage medium, which when executed by a data processing system, performs a process for classifying materials, comprising:
- receiving visual image data of each piece of a collection of materials comprising pieces that are monetary coins and pieces that are not monetary coins;
- classifying certain pieces of the collection of materials as monetary coins as a function of visual characteristics captured from the visual image data, wherein the visual characteristics are unique to monetary coins; and
- classifying a remainder of the pieces of the collection of materials as not monetary coins, wherein the remainder of the pieces of the collection of materials classified as not monetary coins comprise shredded end-of-life vehicle scrap pieces having irregular shapes and sizes.

* * * * *